US011678398B2

(12) United States Patent
Laselva et al.

(10) Patent No.: US 11,678,398 B2
(45) Date of Patent: Jun. 13, 2023

(54) USER EQUIPMENT CONTEXT DUPLICATION

(71) Applicant: Nokia Technologies Oy, Espoo (FI)

(72) Inventors: Daniela Laselva, Klarup (DK); Subramanya Chandrashekar, Bangalore (IN); Ahlem Khlass, Massy (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/998,745

(22) PCT Filed: May 5, 2021

(86) PCT No.: PCT/FI2021/050330
§ 371 (c)(1),
(2) Date: Nov. 14, 2022

(87) PCT Pub. No.: WO2021/260256
PCT Pub. Date: Dec. 30, 2021

(65) Prior Publication Data
US 2023/0132755 A1    May 4, 2023

(30) Foreign Application Priority Data

Jun. 24, 2020    (IN) .............................. 202041026720

(51) Int. Cl.
*H04W 76/25*    (2018.01)
*H04W 76/19*    (2018.01)

(52) U.S. Cl.
CPC ........... *H04W 76/25* (2018.02); *H04W 76/19* (2018.02)

(58) Field of Classification Search
CPC .............................. H04W 76/25; H04W 76/19
See application file for complete search history.

(56) References Cited

U.S. PATENT DOCUMENTS

2019/0261227 A1    8/2019  Guo
2019/0313333 A1*  10/2019  Kim .................. H04W 52/0225
(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

(Continued)

*Primary Examiner* — Will W Lin
(74) *Attorney, Agent, or Firm* — Nokia Technologies Oy

(57) ABSTRACT

Systems, methods, apparatuses, and computer program products for user equipment (UE) context duplication. In certain embodiments, when a UE may resume at a target network node within its configured radio area, a duplication of a UE context may occur at the target network node, and the target network node may allocate an additional/secondary identifier to the UE. The secondary identifier may indicate the UE's identity within the network. When configured with a secondary identifier, the UE may retain an original/primary identifier assigned by the anchor network node. The anchor network node may retain the UE context and may maintain user plane connectivity to a core network. The UE may use this primary identifier for operations within the configured radio area, whereas the secondary identifier may be used when resuming operations to a cell that is outside of the configured radio area.

15 Claims, 7 Drawing Sheets

(56) References Cited

U.S. PATENT DOCUMENTS

| | | | |
|---|---|---|---|
| 2019/0320483 A1* | 10/2019 | Palat | H04W 76/19 |
| 2019/0394686 A1 | 12/2019 | Bachmann et al. | |
| 2020/0029239 A1* | 1/2020 | Chen | H04W 76/19 |
| 2020/0053613 A1* | 2/2020 | Cirik | H04L 5/001 |
| 2020/0100311 A1* | 3/2020 | Cirik | H04W 74/0833 |
| 2021/0195675 A1* | 6/2021 | Park | H04W 88/14 |
| 2022/0060888 A1* | 2/2022 | Li | H04W 12/10 |
| 2022/0070958 A1 | 3/2022 | Khlass et al. | |

OTHER PUBLICATIONS

"3rd Generation Partnership Project; Technical Specification Group Radio Access Network; NR; User Equipment (UE) procedures in Idle mode and RRC Inactive state (Release 16)", 3GPP TS 38.304, V16.0.0, Mar. 2020, pp. 1-38.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NG-RAN; Xn application protocol (XnAP) (Release 16)", 3GPP TS 38.423, V16.1.0 , Mar. 2020, pp. 1-334.

"Work Item on NR smalldata transmissions in INACTIVE state", 3GPP TSG RAN Meeting #86, RP-193252, Agenda: 9.1.2, ZTE Corporation, Dec. 9-12, 2019, 4 pages.

International Search Report and Written Opinion received for corresponding Patent Cooperation Treaty Application No. PCT/FI2021/050330, dated Jul. 2, 2021, 13 pages.

\* cited by examiner

USER EQUIPMENT CONTEXT DUPLICATION

RELATED APPLICATION

This application was originally filed as PCT Application No. PCT/FI2021/050330 on May 5, 2021, which claims priority from India Provisional Application No. 202041026720, filed Jun. 24, 2020, each of which is hereby incorporated by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for user equipment (UE) context duplication.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G is mostly built on a new radio (NR), but a 5G network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, a method performed by a first network node may include configuring, to a user equipment, a radio area associated with the user equipment. The method may include assigning, to the user equipment, a first identifier to be used by the user equipment within the configured radio area while in an inactive state for identifying the user equipment when accessing a network. The method may include transmitting, to a second network node, a message associated with duplicating a context associated with the user equipment at the second network node. The method may include retaining the context at the first network node. The method may include maintaining a core network user plane connectivity associated with the user equipment. The method may include handling core network-triggered functionality for the user equipment.

In a variant, the method may include transmitting, to the user equipment, a second identifier provided by the second network node and to be used by the user equipment while in the inactive state for identifying the user equipment when accessing a network. In a variant, the second identifier may be used by the user equipment within or outside the configured radio area. In a variant, transmitting the message may further include transmitting the message to the second network node based on a request for duplicating the context from the second network node.

In a variant, the message may include at least one of a duplication of the context, the context for relocation of the context, or an indication of context duplication or relocation failure. In a variant, the first identifier may be used by the first network node for paging the user equipment. In a variant, the second identifier may be used for context duplication within the configured radio area and/or context retrieval outside of the configured radio area. In a variant, the first network node may include an anchor network node or a last serving network node of the user equipment. In a variant, the first identifier may be additionally used with the second identifier outside of the configured radio area.

According to a second embodiment, a method performed by a second network node may include receiving, from a first network node, a message associated with duplicating at the second network node a context associated with a user equipment. The method may include storing the duplicate of the context. The method may include assigning a second identifier to the user equipment. The second identifier may be different than a first identifier assigned to the user equipment by the first network node. The first identifier and the second identifier may be used by the user equipment while in an inactive state for identifying the user equipment when accessing a network.

In a variant, the method may include transmitting, to the first network node, a request to duplicate the context associated with the user equipment. In a variant, the message may be received based on the request. In a variant, the first identifier may be used by the first network node for paging the user equipment. In a variant, the second identifier may be used for context duplication within the configured radio area and/or context retrieval outside of the configured radio area. In a variant, the second network node may be located within the configured radio area or may be located at an edge of the configured radio area.

In a variant, the method may further include transmitting, to the user equipment, an indication of a type of the second identifier. In a variant, assigning the second identifier may further comprise assigning the second identifier based on receiving a resume request message. In a variant, the received resume message may comprise the first identifier and/or the second identifier. In a variant, the method may further include transmitting, to the first network node, a context release indication after the context has been relocated to a target network node outside of the configured radio area. In a variant, the method may further include transmitting, to a third network node, a message associated with duplicating the context associated with the user equipment at the third network node or relocating the context associated with the user equipment to the third network node outside of the configured radio area.

According to a third embodiment, a method may include receiving, by a first network node outside of a configured radio area associated with a user equipment, a radio area update message. The radio area update message may include a second identifier of the user equipment or a combination of a first identifier and the second identifier. The second identifier may be different than the first identifier to be used within the configured radio area. The first identifier and the second identifier may be used by the user equipment while in an inactive state for identifying the user equipment when accessing a network. The method may include obtaining a context associated with the user equipment based on the second identifier from a second network node. The method may include transmitting, to the second network node, a message associated with releasing the context of the user equipment.

In a variant, the radio area update message may be received from the user equipment. In a variant, the first identifier may be used for paging the user equipment.

According to a fourth embodiment, a method may include receiving, by a user equipment, a radio area configuration and a first identifier from a first network node within the configured radio area. The method may include receiving a second identifier from a second network node within the configured radio area. The first identifier and the second identifier may be used by the user equipment while in an inactive state for identifying the user equipment when accessing a network. The method may include storing the radio area configuration, the first identifier, and the second identifier.

In a variant, the receiving of the second identifier may be based on transmitting a resume request message to the second network node within the configured radio area. In a variant, the method may include transmitting a resume request message towards the second network node. In a variant, the resume request message may comprise at least one of the first identifier or the second identifier. In a variant, the method may include transmitting a resume request message towards a target network node outside the configured radio area. In a variant, the resume request message may comprise the second identifier. In a variant, the resume request message may comprise both the first identifier and second identifier.

In a variant, the resume request message may be triggered by at least one of a periodic area update, an update associated with crossing a boundary of the configured radio area, receiving a core network paging, receiving a radio area network paging, or having uplink data in a buffer. In a variant, the method may include receiving a third identifier from a third network node within the configured radio area. In a variant, the method may include over-writing the second identifier with the third identifier. In a variant, the method may include receiving an indication of a type of the second identifier.

A fifth embodiment may be directed to an apparatus including at least one processor and at least one memory comprising computer program code. The at least one memory and computer program code may be configured, with the at least one processor, to cause the apparatus at least to perform the method according to the first embodiment, the second embodiment, the third embodiment, or the fourth embodiment, or any of the variants discussed above.

A sixth embodiment may be directed to an apparatus that may include circuitry configured to perform the method according to the first embodiment, the second embodiment, the third embodiment, or the fourth embodiment, or any of the variants discussed above.

A seventh embodiment may be directed to an apparatus that may include means for performing the method according to the first embodiment, the second embodiment, the third embodiment, or the fourth embodiment, or any of the variants discussed above. Examples of the means may include one or more processors, memory, and/or computer program codes for causing the performance of the operation.

An eighth embodiment may be directed to a computer readable medium comprising program instructions stored thereon for performing at least the method according to the first embodiment, the second embodiment, the third embodiment, or the fourth embodiment, or any of the variants discussed above.

A ninth embodiment may be directed to a computer program product encoding instructions for performing at least the method according to the first embodiment, the second embodiment, the third embodiment, or the fourth embodiment, or any of the variants discussed above.

BRIEF DESCRIPTION OF THE DRAWINGS

For proper understanding of example embodiments, reference should be made to the accompanying drawings, wherein.

DETAILED DESCRIPTION

Figure 1:
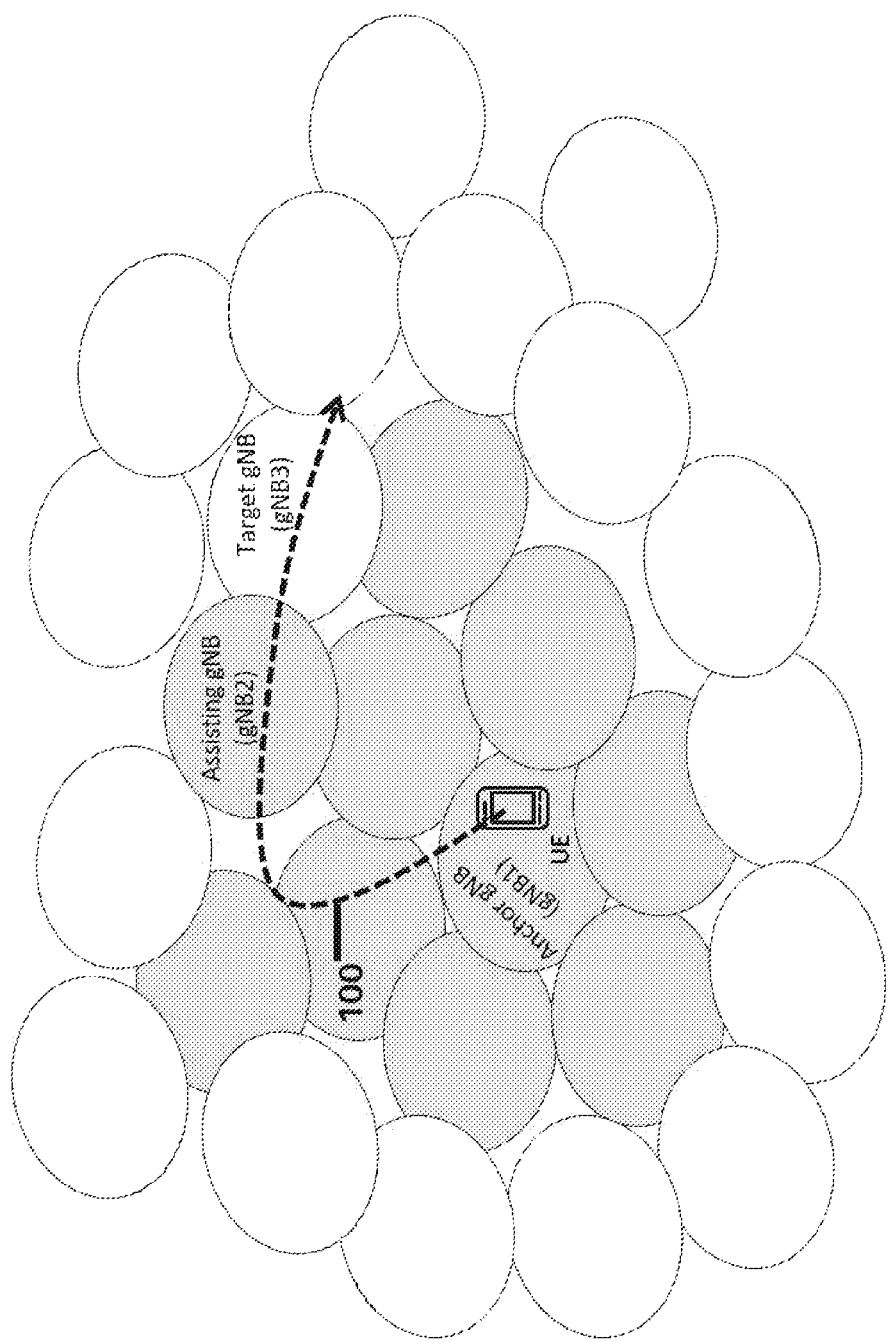
FIG. 1 illustrates an example of a UE having an anchor network node and an assisting network node within its configured radio area and moving outside its configured radio area to a third network node, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for UE context duplication is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

According to some embodiments, a UE may be configured in an inactive state to save power. As an example, the inactive state may include an independent radio resource control (RRC) state, referred to as RRC_INACTIVE. One objective of introducing the inactive state in addition to a connected state (e.g., RRC_CONNECTED) and idle state (e.g., RRC_IDLE) may be to reduce UE power consumption by alleviating the control plane (CP) procedures used at the RRC state change and associated latency.

When a UE is in the inactive (e.g., RRC_INACTIVE) state, the radio connection may be suspended while the core network connectivity is maintained active (e.g., the UE may be kept in a connection management (CM)-CONNECTED state). A UE access stratum (AS) context (referred to as UE inactive AS context) may be stored at both the UE and radio access network (RAN) sides for the fast resume of a suspended connection, including the latest radio bearer configuration used for the data/signalling transmission, and the security keys and algorithms for integrity protection and ciphering in the radio interface. Based on this retained information, the UE can resume the radio connection and restore the security context with a lower delay and associated signalling overhead as compared to a UE in a RRC_IDLE state, which may have to establish a new connection to both the radio and core network. The network can move a UE from RRC_CONNECTED to RRC_INACTIVE by sending an RRC Release including a suspend configuration ("Suspend Config").

Figure 2:
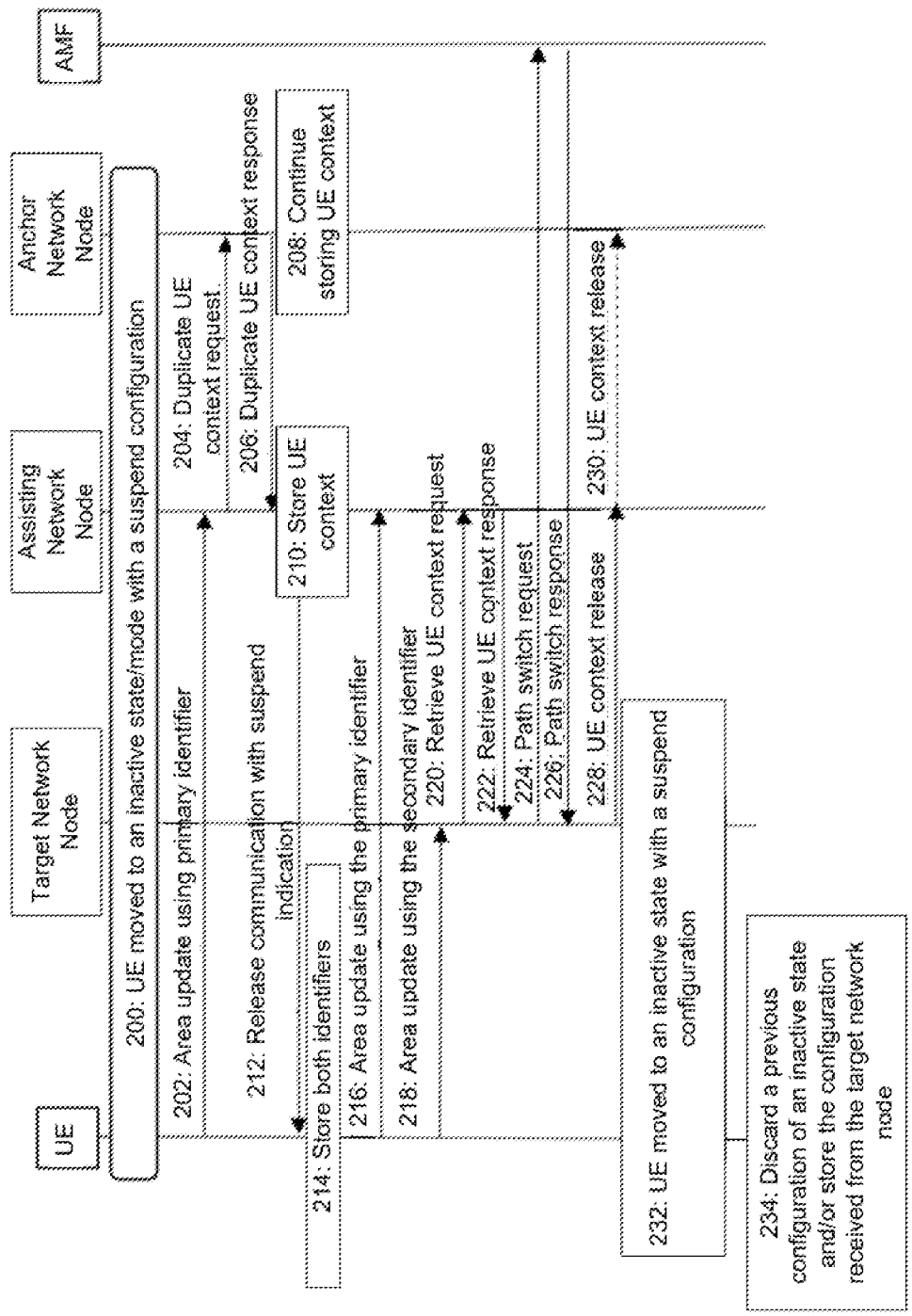
FIG. 2 illustrates an example signal diagram of UE context duplication, according to some embodiments.

A UE in the RRC_INACTIVE state may request to resume its suspended RRC connection prior to uplink (UL) data transmission, based on a paging message for downlink (DL) data reception, and for the RAN-based notification area update (RNAU) procedure. FIG. 2 illustrates an example signaling diagram of UE-triggered resume with successful UE context retrieval, according to an embodiment. As illustrated in the example of FIG. 2, if the UE attempts to access a gNB other than an anchor gNB, such target cell may have to initiate a Xn access point (AP) Retrieve UE context procedure to fetch the UE access stratum (AS) context from the anchor gNB, identified through an inactive radio network temporary identifier (I-RNTI). This may also trigger an Xn-user plane (UP) address indication procedure, including tunnel information for potential recovery of data from the anchor gNB. Upon successful UE context retrieval, the receiving gNB may become the serving gNB and the UE may be moved then to a RRC_CONNECTED state. A next generation application protocol (NGAP) path switch procedure may be further initiated to update the user plane (UP) connection to the 5G core network from the anchor gNB to the new serving gNB. Once completed, the serving gNB may release the UE context at the anchor gNB via the Xn-application protocol (AP) UE context release procedure.

A UE and various network nodes (e.g., a gNB, a last serving gNB (the anchor gNB), and an access and management function (AMF)) may be involved in operations related to a UE-triggered resume with successful UE context retrieval, and the UE may be in an RRC_INACTIVE state and CM-CONNECTED state. The UE may transmit, to the gNB, an RRC resume request. The gNB may transmit, to the last serving gNB, a request to retrieve a UE context. The last serving gNB may transmit, to the gNB, a response to the request. The gNB may transmit, to the UE, an RRC resume message. The UE may be in a RRC_CONNECTED state and a CM-CONNECTED state.

The UE may transmit, to the gNB, a RRC resume complete message. The gNB may transmit, to the last serving gNB, an Xn-user (Xn-U) address indication. The gNB may transmit, to the AMF, a request for a path switch. The AMF may transmit, to the gNB, a response to the request. The gNB may transmit, to the last serving gNB, a message to release the UE context.

A UE in a RRC_INACTIVE state can be configured by the last serving NG-RAN node with a UE-specific RAN-based notification area (RNA) (e.g., using a RAN-NotificationAreaInfo message), which can cover a single or multiple cell(s), belonging to one or multiple gNBs. Inside this area, a UE can move without notification to the network about its location (e.g., cell (re)-selections within the RNA may be transparent to the network). The network can page the UE with RAN-level paging from a cell within the RNA.

Also, the UE can resume the RRC connection in a cell within the RNA using its unique identifier, the I-RNTI, which a gNB may be able to use to identify the last serving gNB (an anchor gNB) and/or the UE itself. The anchor gNB may also maintain the UE-associated connection with the serving AMF and user plane function (UPF). The RNA can be configured as a list of cells (e.g., a UE may be provided an explicit list of cells that constitute the RNA) or a list of RAN areas. In the case of a list of RAN areas, a UE may be provided a RAN area identifier, where a RAN area may be a subset of a core network (CN) tracking area or may comprise a CN tracking area. A RAN area may be specified by one RAN area identifier, which may consist of a tracking area code (TAC) and optionally a RAN area code. A cell may broadcast one or more RAN area identifiers in the system information.

A UE may trigger a RAN-based notification area update (RNAU) procedure, periodically and/or when it re-selects a cell outside the configured RNA. The procedure can be completed successfully both with and without UE context relocation. No UE context relocation may be used if the UE is within the configured RNA based on the last serving gNB decision not to relocate the UE context. In this case, the UE may be maintained in an RRC_INACTIVE state. The RNAU procedure may be also completed, e.g., with the last serving gNB that decides to move the UE to an RRC_IDLE state.

With respect to a RNAU procedure with UE context relocation, certain operations may be similar to that described above. This request may be irrespective of what the network may then decide with respect to the UE context relocation. The gNB may keep the UE in a RRC_INACTIVE state. In this case, the gNB may transmit, to the UE, a RRC release message that includes a suspend indication.

With respect to a periodic RNAU procedure without UE context relocation, certain operations may be similar to those described above. The request to request the UE context may be from a target cell to a last serving cell (anchor gNB) and may include a RNAU as the cause value. This request may be performed in the same way regardless of whether the anchor gNB then decides to perform UE context relocation. The last serving gNB may transmit, to the gNB, an indication that the retrieval of the UE context has failed, which notifies that no context relocation will be performed.

With respect to a RNA update procedure with transition to a RRC_IDLE state, certain operations may be similar to operations described above. The last serving gNB may release the UE context. The gNB may transmit, to the UE, an RRC release message. The UE may be in a RRC_IDLE state and a CM-IDLE state.

Certain aspects of NR may be concerned with avoiding the signaling overhead and delay associated with transitioning from a RRC_INACTIVE state to a RRC_CONNECTED state to perform a short data transmission. This functionality may be important since the RRC_INACTIVE state may facilitate transitioning of a UE with infrequent data transmission to a state with minimum signaling overhead and power consumption. The RRC_INACTIVE state may support small data transmission, such as UL small data transmissions using random access channel (RACH)-based schemes (e.g., 2-step and 4-step RACH) and/or transmission of UL data on pre-configured physical uplink shared channel (PUSCH) resources (e.g., reusing the configured grant type 1), when a timing advance (TA) is valid.

The anchor gNB that moved a UE out of the RRC_CONNECTED state and to the current RRC_INACTIVE state may be the network node that has two functions associated with the given UE while it is in the RRC_INACTIVE state: 1) storing an AS context; and 2) maintaining its user plane (UP) connectivity to the core network.

The I-RNTI, assigned by the anchor gNB to the UE, may be able to help a different gNB to identify both the anchor gNB and the UE itself. When the UE resumes with a different gNB than the anchor gNB, the UE context relocation may occur, where identification is based on such identifier. A target gNB, upon receiving a resume request from the UE, and if able to resolve the anchor gNB identity contained in the I-RNTI, may trigger a UE context retrieval request from the anchor gNB, in order to verify if the UE has a valid context and/or to fetch it for use during the RRC connection resume.

Figure 3:
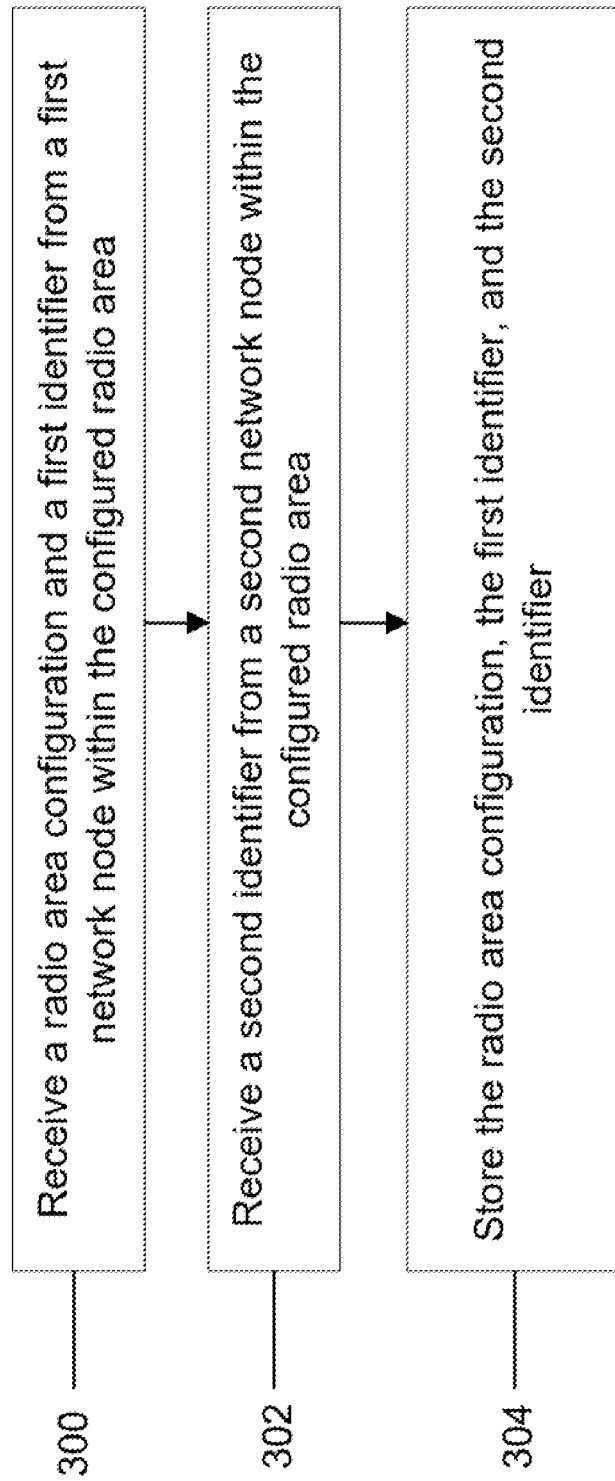
FIG. 3 illustrates an example flow diagram of a method, according to some embodiments.

Upon a successful UE context relocation procedure, the UE context may be relocated from the anchor gNB to the new serving gNB. In addition, according to an embodiment, the path switch may occur as illustrated in the example of FIG. 3. That is, the two procedures of hosting the UE context and CN UP connectivity may be related to each other. The new serving gNB may become the new anchor gNB for the UE and may assign an RRC_INACTIVE state configuration comprising a new I-RNTI.

A UE in the RRC_INACTIVE state may have to perform periodic RNA updates (RNAUs) according to a timer, such as the network defined timer PeriodicRNAU-TimerValue, and RNA crossing event-triggered RNAUs. The latter may use a context relocation. Instead, at a periodic RNAU, which may be performed within the configured RNA, both of the following options may be supported: 1) the I-RNTI may remain the same after a periodic RNAU (e.g., the anchor gNB may send a failure message to the target gNB and the UE may be instructed to return to an RRC_INACTIVE state retaining the same RRC_INACTIVE configuration, including the same I-RNTI identifier); and 2) the I-RNTI may be changed (reconfigured) after a periodic RNAU (e.g., when the UE context is relocated (and a path switch is made), a new I-RNTI may be assigned to the UE in order to be able to identify the new anchor gNB from which to retrieve the UE's context).

It may be left to a network decision (at the anchor gNB) as to whether to relocate the UE context for periodic RNAUs (within the same RNA). If the context relocation, and consequently path switch, is performed when the UE performs a periodic RNAU in a different target gNB, the associated signaling overhead may become large. This may be unnecessary, such as when the UE does not have a data transfer to perform. Conversely, if the context relocation is never performed within the RNA, this may result in larger context retrieval delay, or even retrieval failure, when the UE crosses an RNA border. The UE context retrieval procedure may comprise the request and response (or failure) messages that are exchanged over the Xn interface and which may lead to a certain context retrieval delay. This delay may depend on the Xn connectivity (latency) between the involved gNBs, which may depend on the size of the RNA (e.g., the bigger the RNA, the larger the distance may be between a gNB located at the edge of the RNA and the anchor cell and, thus, the larger may be the context retrieval delay). Therefore, the target cell (outside the RNA) may be located far away from the anchor cell and may not be able to resolve the anchor gNB identity, especially when the RNA is large. Potentially the two gNBs may be more than one Xn link away from each other making it unfeasible to retrieve the context since certain procedures for doing so may assume a single Xn link (e.g., direct Xn connectivity).

In a communication system, e.g., NR, the network may provide a UE-specific RNA configuration to the UE, including certain information elements (IEs), where the exact configuration may be determined by the network. In the case of a periodic RNA update within the RNA, if the last serving gNB decides not to relocate the UE context, it may fail the Xn-AP Retrieve UE context procedure and may return the UE to an RRC_INACTIVE state, or to an RRC_IDLE state directly using an encapsulated RRC Release message. On the contrary, if the network decides to relocate the UE context, it may perform context forwarding to the target gNB, and the path switch may be completed. Afterwards, the new gNB may become the new anchor gNB for the UE taking the dual role of storing the UE context and maintaining the CN UP-connectivity for the UE. As such, the UE may have a single I-RNTI indicative of its anchor gNB, which may be a single network node (e.g., gNB) that stores the UE context and maintains the CN UP-connectivity.

Some embodiments described herein may provide for UE context duplication. In certain embodiments, when a UE resumes at a target network node (e.g., a gNB) within its configured radio area (e.g., RNA), a duplication (rather than relocation) of a UE context (e.g., an AS context) may occur at the target network node and the target network node may allocate an additional/secondary identifier (e.g., a secondary RRC_INACTIVE mode identifier, such as an I-RNTI2) to the UE. The secondary identifier may indicate the UE's identity within the network. When configured with a secondary identifier, the UE may retain an original/primary identifier (e.g., an I-RNTI, such as an I-RNTI1) assigned by the anchor gNB. The anchor gNB may retain the UE context and may maintain the UP connectivity to the CN (e.g., no path switch may occur upon the context duplication at the target network node). The UE may use this primary identifier for operations within the configured radio area (e.g., for RNAUs/data transfers, paging, and/or the like), whereas the secondary identifier may be used when resuming operations to a cell that is outside of the configured radio area, thereby supporting extended mobility of the UE in an inactive state, such as an RRC_INACTIVE state (however, in some embodiments the primary and/or secondary identifiers may be used both within or outside the configured radio area). The network node with the duplication of the UE context may assist in resuming operations to the cell outside of the configured radio area, and therefore may also be referred to as an assisting network node. In addition, certain embodiments may enable faster context retrieval and/or lower context retrieval failure likelihood outside the configured radio area. In this way, certain embodiments may propose a way to reduce or eliminate signaling associated with the support of mobility of inactive UEs (e.g., RRC_INACTIVE state) and/or may decrease the context retrieval delay or the retrieval failure likelihood.

FIG. 1 illustrates an example of a UE having an anchor network node and an assisting network node within its configured radio area and moving outside its configured radio area to a third network node, according to some embodiments. For example, FIG. 1 illustrates a gNB1 as the anchor network node, a gNB2 as the assisting network node, and a gNB3 as the third network node (e.g., a target network node outside of the configured radio area described herein). The gray ovals may represent the configured radio area of the UE, and the white ovals may represent an area outside of the configured radio area. As illustrated by trajectory 100 (the dashed line in FIG. 1), a UE according to certain embodiments may travel from a configured radio area to an area outside of the configured radio area (e.g., to an area associated with the gNB3).

As described above, FIG. 1 is provided as an example. Other examples are possible, according to some embodiments.

FIG. 2 illustrates an example signal diagram of UE context duplication, according to some embodiments. FIG. 2 illustrates a UE, a target network node outside the configured area (e.g., the gNB3 from FIG. 1), an assisting network node (e.g., the gNB2 from FIG. 1), an anchor network node (or a last serving network node for the UE) (e.g., the gNB1 from FIG. 1), and an AMF. As illustrated at 200, the UE may be moved to an inactive state or mode with a suspend configuration. For example, the UE may be moved to an RRC_INACTIVE state by the anchor network node. The suspend configuration may include a primary identifier, such as a I-RNTI1, and may be associated with a first configured radio area. The primary identifier may be used for paging the UE (and the UE may monitor for the paging). For example, the primary identifier may be used for CN paging and/or radio access network (RAN) paging that notifies of a presence of downlink (DL) data. Additionally, or alternatively, the primary identifier may be used to indicate the particular network node (anchor network node) that terminates the CN-UP connection of the UE.

As illustrated at 202, the UE may transmit, to the assisting network node, an update using the primary identifier. For example, the UE may transmit a RNAU (e.g., a periodic RNAU or a resume message to resume an RRC connection in an RRC_CONNECTED state) using the I-RNTI1. As illustrated at 204, the assisting network node may transmit, to the anchor network node, a request to duplicate a UE context (e.g., an AS context). In some embodiments, the assisting network node may not transmit a request to duplicate a UE context. Rather, the anchor network node may determine to duplicate the context. For example, one trigger of the anchor node for the duplication may be based on receiving, from the assisting node, a UE context request (i.e., without including a duplication request). The anchor node may then decide to duplicate the context and may respond by provisioning the duplicated context and indicating the context duplication. As illustrated at 206, the anchor network node may transmit, to the assisting network node, a response to the request. In some embodiments, the response may include the context for the UE. In some embodiments, the request may include an indication of duplication of the context. Note that in some embodiments, the anchor network node may send a duplication of the UE context (e.g., an AS context) to the assisting network node (e.g. a potential target node within the configured RNA) even without receiving the request from the assisting network node.

As illustrated at 208, the anchor network node may retain (or continue storing) the UE context after transmitting the response. In an inactive state, a UE may not have a serving cell. Rather, it may have a camping cell, in which it performs, for example, paging monitoring and transmitting RNA update signaling. Upon transmitting the communication associated with duplicating a UE context, described elsewhere herein, the UE may have either the anchor network node or the assisting network node (that is duplicating the context) as the camping cell. If the transmitting is initiated from the assisting network node upon receiving the radio area update from the UE, then the assisting network node may be the camping cell. Alternatively, if the anchor network node is initiating the duplicating, it could be that anchor network node is still the camping cell. Moreover, after the UE has visited another network node that duplicates the context, the UE may move back to the anchor network node. In this case, the camping cell can change while the network duplicates the context.

As illustrated at 210, the assisting network node may store the UE context, e.g., based on receiving the response from the anchor network node. As illustrated at 212, the assisting network node may transmit, to the UE, a release communication (e.g., a RRC release) with a suspend indication. The RRC release may include a secondary identifier as described herein. For example, the secondary identifier may be used by the UE when accessing a network outside of a configured radio area (e.g., for duplicate UE context creation in assisting a network node in context retrieval outside of the configured radio area). Additionally, or alternatively, the assisting network node may transmit information identifying a type of the secondary identifier (e.g., identifying the secondary identifier as a secondary identifier, rather than a primary identifier). In some embodiments, the assisting network node may transmit the secondary identifier to the UE via the anchor network node (e.g., by providing the secondary identifier to the anchor network node, and the anchor network node providing the secondary identifier to the UE).

In some embodiments, the secondary identifier may be used within the configured radio area as well. This may provide the advantage that the UE context copy could be (requested from and) transferred from a former assisting network node to a new assisting network node (rather than being transferred through the anchor network node). This may also help to ensure that the clean-up (e.g., context discarding, and/or the like) at the former assisting network node may be performed more efficiently. In some embodiments, the secondary identifier may identify the UE when the UE is performing operations in an inactive state. For example, the operations may include an area update to the assisting network node or the target network node, resuming operations based on a periodic RANU, resuming operations based on crossing a boundary of the configured radio area, resuming operations after receiving CN/RAN paging, resuming operations based on a presence of UL data in a buffer, and/or the like.

In some embodiments, the anchor network node, rather than the assisting network node, may transmit the second identifier (and/or the release that includes the suspend configuration) to the UE. The anchor network node, for example upon receiving a context request by the target network node, may provide the UE context to the target network node with an indication of context duplication and a message for the UE containing the secondary identifier (based on a target network node identifier), which is provided to the UE by the target network node. The target network node may store the duplicated context linked to such secondary identifier.

As illustrated at 214, the UE may store both the primary and secondary identifiers. As illustrated at 216, the UE may transmit, to the assisting network node, an area update using the primary identifier (e.g., the I-RNTI1). Additionally, or alternatively, the area update may include the secondary identifier. As illustrated at 218, the UE may transmit, to the target network node, an area update using the secondary identifier (and/or the primary identifier). For example, the UE may transmit, to the target network node, a RNAU using the I-RNTI2. Receiving both identifiers by the target network node may provide for some optimizations related to, for example, how to trigger context discarding. For example, if the target network node receives only the secondary identifier, the context release request, described elsewhere herein, may have to be relayed to the anchor network node via the assisting network node. As illustrated at 220, the target network node may transmit, to the assisting network node, a request to retrieve the UE context. For example, the request may include, or may be based on, the secondary identifier. As illustrated at 222, the assisting network node may transmit, to the target network node, a response to the request. For example, the response may include a duplication of the context, the original UE context for relocation of the context, or an indication of context duplication or relocation failure.

As illustrated at 224, the target network node may transmit, to the AMF, a path switch request. As illustrated at 226, the AMF may transmit, to the target network node, a response to the request. As illustrated at 228, the target network node may transmit, to the assisting network node, a communication to release the UE context. The assisting network node may transmit a similar communication to the anchor network node, as illustrated at 230. As illustrated at 232, the UE may be moved to an inactive state/mode with a suspend configuration. For example, the UE may be moved to an RRC_INACTIVE state. The suspend configuration may include a primary identifier, such as a I-RNTI3 and may be associated with a second configured radio area. The target network node may be the network node that moves the UE to the inactive state. As illustrated at 234, the UE may discard a previous configuration of an inactive state and may store the configuration received from the target network node. For example, the UE may overwrite the secondary identifier with a new secondary identifier. For example, the overwriting may occur in the case where the UE moves from a first assisting network node to a second assisting network node within the configured ratio area, and is assigned another secondary identifier. In this case, the UE may replace the previous secondary identifier (assigned by the first assisting node) with the new secondary identifier (assigned by the second assisting node).

From the above, in certain embodiments, the anchor network node may be the node that may allocate the primary identifier to the UE (e.g., the I-RNTI1), may store the UE context (e.g., the AS context), and/or may maintain the CN-UP connectivity either upon moving the UE to the inactive state or upon a context relocation procedure from another network node. With respect to maintaining the CN-UP connectivity, there may be at least one user plane tunnel that remains established for the UE, while the UE is in the inactive state, connecting the RAN to the CN (e.g., user plane function (UPF)). These tunnels may be used for the network to be able to forward potential uplink data from the UE via a network node, through these tunnels, to the UPF (and then from the UPF to the destination application server).

Additionally, or alternatively, the anchor network node may be the node that may assign a suspend configuration/indication to the UE, including the primary identifier to identify the UE and the anchor network node, which may be used by the UE within its configured radio area (for connection resume/RNAUs/data transfer in the inactive state). Within the configured radio area, each network node may be assumed to be able to identify the anchor network node and may have direct connectivity to it (e.g., a one hop Xn context retrieval from the anchor network node may be assumed).

From the above, in certain embodiments, the assisting network node may be the node that may store the UE context (a duplicate UE context in the same configured radio area), such as to enable a faster context retrieval and/or to decrease context retrieval failure from outside the configured area. In certain embodiments, a target network node within the configured radio area may take the role of the assisting network node. Additionally, or alternatively, the assisting network node may perform processing (e.g., clean-up, such as context discarding, and/or the like) related to resources at the anchor network node after the UE context has been retrieved. For example, the second network node may sends a context release indication to the anchor network node after the UE context has been relocated to a target network node outside the configured radio area (e.g., if the context was retrieved by the target network node using the secondary identifier). Considering an example scenario where the target network node successfully relocates the context from the assisting network node, the target network node may perform a path switch based on the information provided in the UE context.

The assisting network node UE context (duplicate) may then be cleaned-up, where the assisting node may be responsible for clean-up of the UE context (original) at the target network node.

In other embodiments, a network node located at the edge of the configured radio area may take the role of the assisting network node in cases where the edge condition can be identified. That is, in some embodiments, the context duplication may occur at some specific network node at the edge of the configured radio area. In some cases, new Xn access point (AP) duplicate UE context request and response messages may be used (e.g., this may be implemented, for example, by using an existing Xn-AP retrieve UE context request, but including a flag that indicates duplication of the context). By duplicating the context at the edge of the configured radio area, Xn network signaling can be reduced and the risk of unsuccessful context retrieval can be reduced as well.

The target network node may (after retrieving a copy of the UE context from the anchor network node) assign an additional/secondary identifier to the UE to identify the assisting network node and the UE. The secondary identifier may be used by the UE when crossing the border of its configured radio area (e.g., when triggering the area update associated with the radio area crossing event), while the primary identifier may still be used within the configured radio area. No context relocation or path switch may be performed by the assisting network node, in certain embodiments. The assisting network node may indicate, to the UE, that the assigned identifier (e.g., the I-RNTI2) may be a secondary identifier, for instance by using a flag in the suspend configuration. The additional identifier may be over-written by the UE whenever a new value is provided by a different target network node, for example, at a later area update.

From the above, whenever reselecting to a cell not belonging to its configured radio area, the UE may perform an area update towards that cell using the secondary identifier (e.g., the I-RNTI2). The target network node may then retrieve the context from the assisting network node, which may be identified based on the secondary identifier. This may be beneficial, especially in the scenarios where a target network node outside the configured radio area either may not have been able to identify the anchor network node and/or may not have direct Xn interface to the anchor network node. Direct Xn connectivity may be assumed present with the assisting network node, which may be located, for example, at the edge of the configured radio area or at least closer to the target network node.

As described above, FIG. 2 is provided as an example. Other examples are possible, according to some embodiments.

FIG. 3 illustrates an example flow diagram of a method, according to some embodiments. For example, FIG. 3 shows example operations of a UE (e.g., apparatus 20 in FIG. 7b). Some of the operations illustrated in FIG. 3 may be similar to some operations shown in, and described with respect to, FIGS. 1-2.

In an embodiment, the method may include, at 300, receiving a radio area configuration and a first identifier from a first network node within the configured radio area, for example, in a manner similar to that at 200. The method may include, at 302, receiving a second identifier, e.g., from a second network node within the configured radio area, in a manner similar to that at 212. In some embodiments, the UE may receive the second identifier from the first network node. The first identifier and the second identifier may be used by the user equipment while in an inactive state for identifying the user equipment when accessing a network. The method may include, at 304, storing the radio area configuration, the first identifier, and the second identifier, for example, in a manner similar to that at 214.

In some embodiments, the receiving of the second identifier may be based on transmitting a resume request message to the second network node within the configured radio area. In some embodiments, the method of FIG. 3 may include transmitting a resume request message towards the second network node. In some embodiments, the resume request message may comprise at least one of the first identifier or the second identifier. In some embodiments, the method of FIG. 3 may include transmitting a resume request message towards a target network node outside the configured radio area. In some embodiments, the resume request message may comprise the second identifier. In some embodiments, the resume request message may comprise both the first identifier and second identifier.

In some embodiments, the resume request message may be triggered by at least one of a periodic area update, an update associated with crossing a boundary of the configured radio area, receiving a core network paging, receiving a radio area network paging, or having uplink data in a buffer. In some embodiments, the method of FIG. 3 may include receiving a third identifier from a third network node within the configured radio area. In some embodiments, the method of FIG. 3 may include over-writing the second identifier with the third identifier. In some embodiments, the method may include receiving an indication of a type of the second identifier. For example the indication may indicate whether the second identifier is a primary identifier or a secondary identifier. In some embodiments, the indication may indicate whether the second identifier is to be used within the configured radio area, outside the configured radio area or both.

As described above, FIG. 3 is provided as an example. Other examples are possible according to some embodiments.

Figure 4:
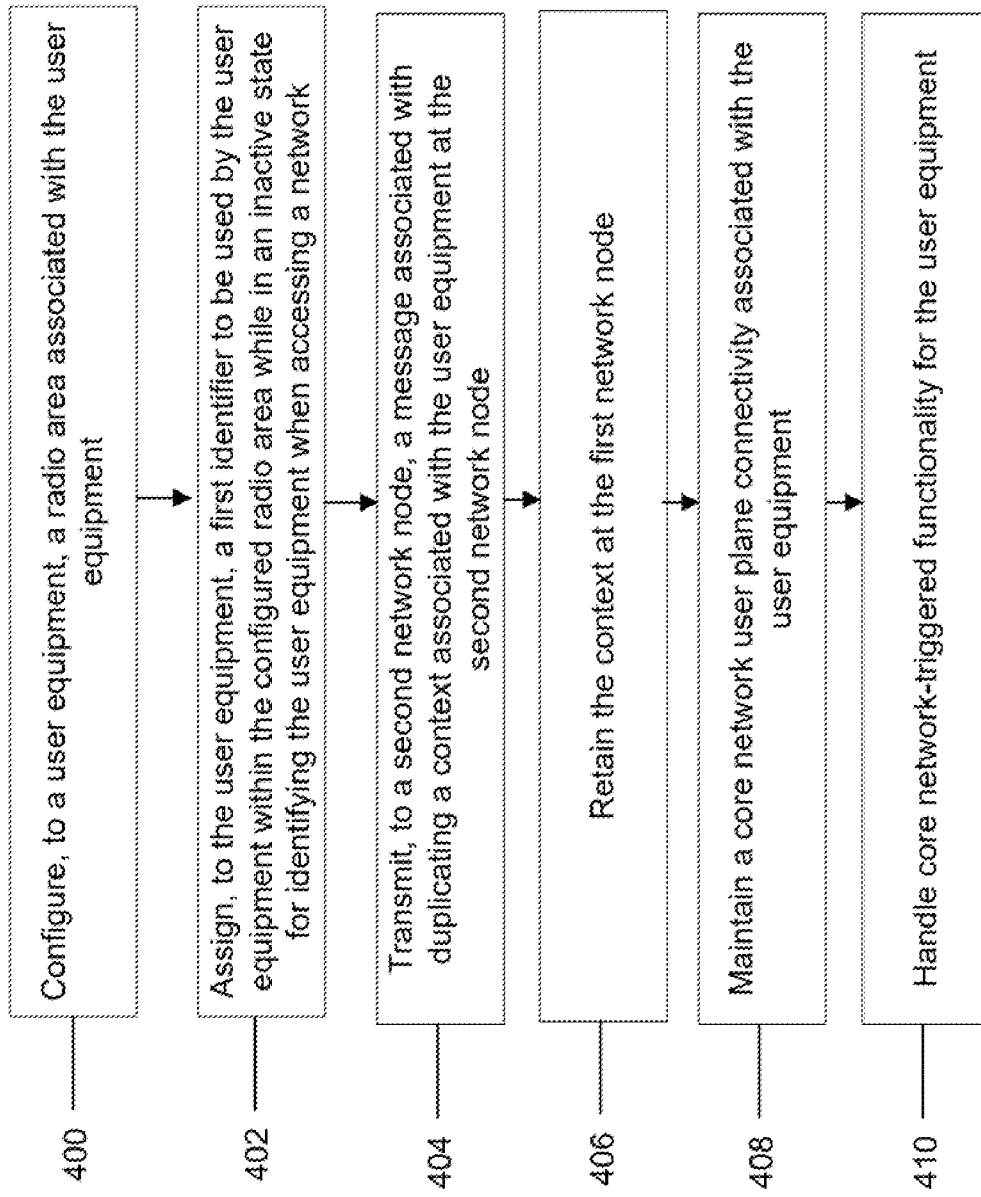
FIG. 4 illustrates an example flow diagram of a method, according to some embodiments.

FIG. 4 illustrates an example flow diagram of a method, according to some embodiments. For example, FIG. 4 shows example operations of a first network node, which could be an anchor network node (e.g., apparatus 10 in FIG. 7a). Some of the operations illustrated in FIG. 4 may be similar to some operations shown in, and described with respect to, FIGS. 1-2.

In an embodiment, the method may include, at 400, configuring, to a user equipment, a radio area associated with the user equipment, for example, in a manner similar to that at 200. The method may include, at 402, assigning, to the user equipment, a first identifier to be used by the user equipment within the configured radio area while in an inactive state for identifying the user equipment when accessing a network, for example, in a manner similar to that described at 200. The method may include, at 404, transmitting, to a second network node, a message associated with duplicating a context associated with the user equipment at the second network node, for example, in a manner similar to that at 206. The method may include, at 406, retaining the context at the first network node, for example, in a manner similar to that at 208.

In some embodiments, the message transmitted to the second network node at 404 may trigger the second network node to assign an additional identifier to the user equipment. The additional identifier is also referred to as a second identifier. The second identifier may be transmitted to the user equipment by the second network node directly or via the anchor network node. The second identifier can be used by the user equipment while in the inactive state for identifying the user equipment when accessing a network.

In some embodiments, the method may further include, at 408, the anchor network node maintaining a core network user plane connectivity associated with the user equipment, for example, in a manner similar to that at 208. In some embodiments, the method may include, at 410, handling core network-triggered functionality for the user equipment.

In some embodiments, the second identifier may be used by the user equipment within or outside the configured radio area. In some embodiments, transmitting the message may further include transmitting the message to the second network node based on a request for duplicating the context from the second network node.

In some embodiments, the message may include at least one of a duplication of the context, the context for relocation of the context, or an indication of context duplication or relocation failure. In some embodiments, the first identifier may be used by the first network node for paging the user equipment. In some embodiments, the second identifier may be used for context duplication within the configured radio area and/or context retrieval outside of the configured radio area. In some embodiments, the first network node may include an anchor network node or a last serving network node of the user equipment. In some embodiments, the first identifier may be additionally used with the second identifier outside of the configured radio area.

As described above, FIG. 4 is provided as an example. Other examples are possible according to some embodiments.

Figure 5:
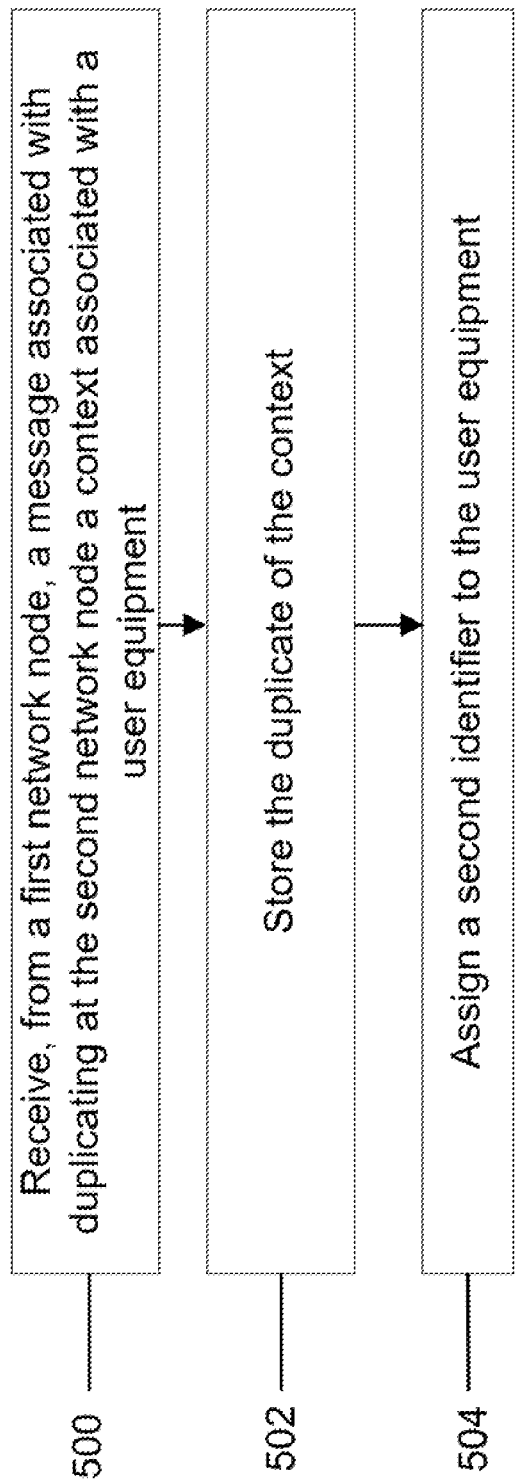
FIG. 5 illustrates an example flow diagram of a method, according to some embodiments.

FIG. 5 illustrates an example flow diagram of a method, according to some embodiments. For example, FIG. 5 shows example operations of an assisting network node (e.g., apparatus 10). Some of the operations illustrated in FIG. 5 may be similar to some operations shown in, and described with respect to, FIGS. 1-2.

In an embodiment, the method may include, at 500, receiving, from a first network node, a message associated with duplicating at the second network node a context associated with a user equipment, for example, in a manner similar to that at 206. The method may include, at 502, storing the duplicate of the context, for example, in a manner similar to that at 210. The method may include, at 504, assigning a second identifier to the user equipment, for example, in a manner similar to that at 212. The second identifier may be different than a first identifier assigned to the user equipment by the first network node. The first identifier and the second identifier may be used by the user equipment while in an inactive state for identifying the user equipment when accessing a network.

In some embodiments, the method may include transmitting, to the first network node, a request to duplicate the context associated with the user equipment. In some embodiments, the message may be received based on the request. In some embodiments, the first identifier may be used by the first network node for paging the user equipment. In some embodiments, the second identifier may be used for context duplication within the configured radio area and/or context retrieval outside of the configured radio area. In some embodiments, the second network node may be located within the configured radio area or may be located at an edge of the configured radio area.

In some embodiments, the method may further include transmitting, to the user equipment, an indication of a type of the second identifier. In some embodiments, assigning the second identifier may further comprise assigning the second identifier based on receiving a resume request message. In some embodiments, the received resume message may comprise the first identifier and/or the second identifier. In some embodiments, the method may further include transmitting, to the first network node, a context release indication after the context has been relocated to a target network node outside of the configured radio area. In some embodiments, the method may further include transmitting, to a third network node, a message associated with duplicating the context associated with the user equipment at the third network node, or relocating the context associated with the user equipment to the third network node outside of the configured radio area.

As described above, FIG. 5 is provided as an example. Other examples are possible according to some embodiments.

Figure 6:
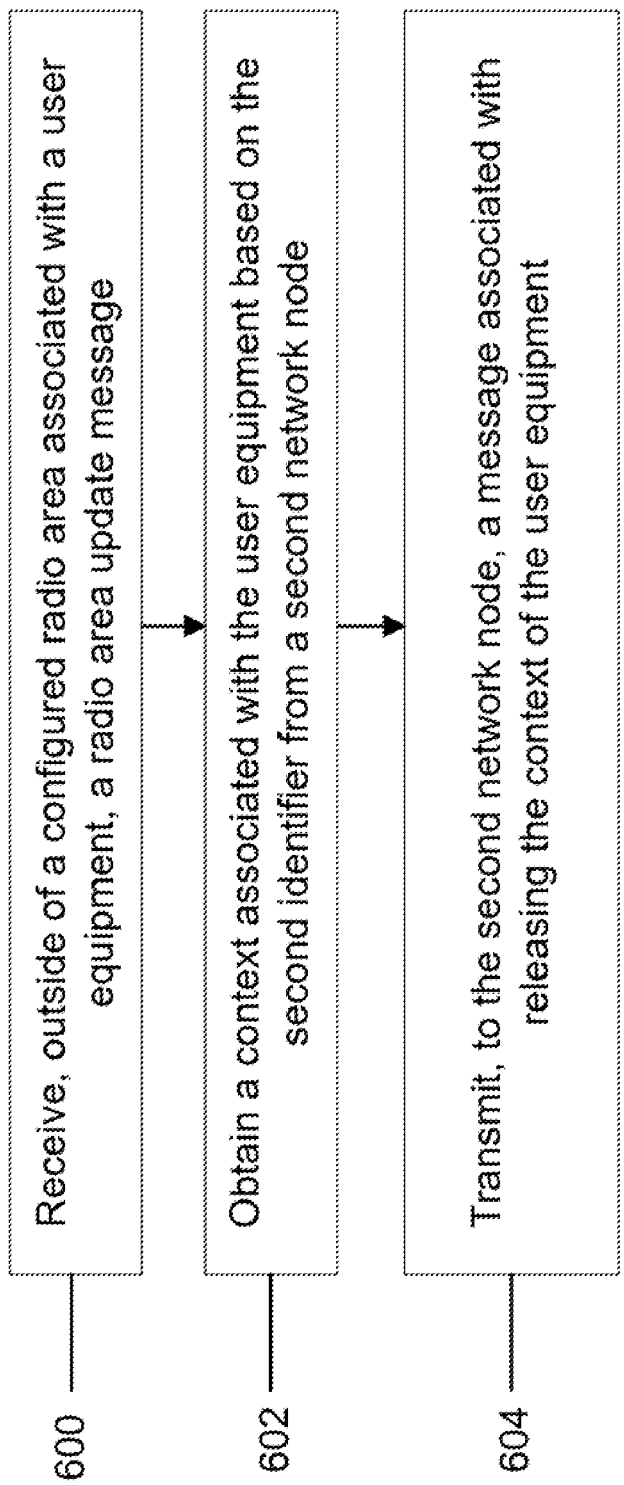
FIG. 6 illustrates an example flow diagram of a method, according to some embodiments.

FIG. 6 illustrates an example flow diagram of a method, according to some embodiments. For example, FIG. 6 shows example operations of a target network node (e.g., apparatus 10). Some of the operations illustrated in FIG. 6 may be similar to some operations shown in, and described with respect to, FIGS. 1-2.

In an embodiment, the method may include, at 600, receiving, outside of a configured radio area associated with a user equipment, a radio area update message, for example, in a manner similar to that at 218. The radio area update message may comprise a second identifier of the user equipment or a combination of a first identifier and the second identifier. The second identifier may be different than the first identifier to be used within the configured radio area. The first identifier and the second identifier may be used by the user equipment while in an inactive state for identifying the user equipment when accessing a network. The method may include, at 602, obtaining a context associated with the user equipment based on the second identifier from a second network node, for example, in a manner similar to that at 220 and/or 222. The method may include, at 604, transmitting, to the second network node, a message associated with releasing the context of the user equipment, for example, in a manner similar to that at 228.

In some embodiments, the method may further comprise the target network node transmitting to a first network node (e.g., an anchor network node of the user equipment) a message associated with releasing the context of the user equipment. The transmission may be based on the first identifier of the user equipment assigned by the first network node. This enables the first network node to release UE context to save memory.

In some embodiments, the radio area update message may be received from the user equipment. In some embodiments, the first identifier may be used for paging the user equipment.

As described above, FIG. 6 is provided as an example. Other examples are possible according to some embodiments.

Figure 7B:
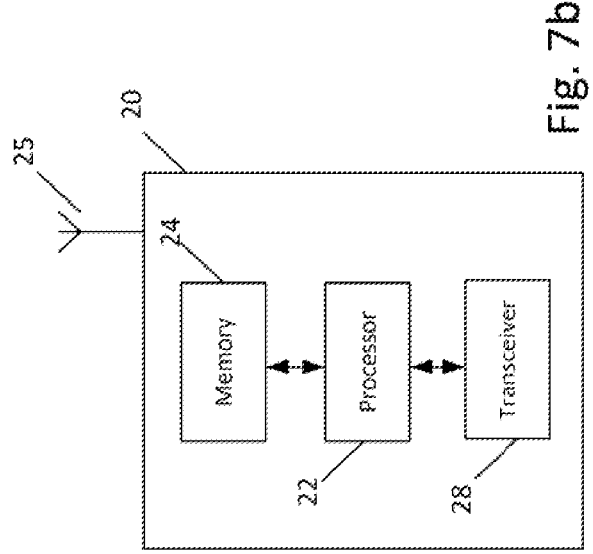
FIG. 7b illustrates an example block diagram of an apparatus, according to another embodiment.
Figure 7A:
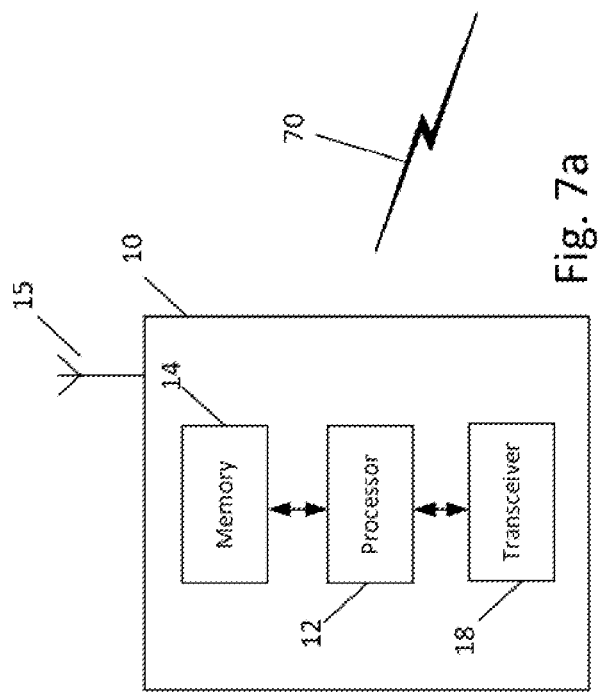
FIG. 7a illustrates an example block diagram of an apparatus, according to an embodiment.

FIG. 7a illustrates an example of an apparatus 10 according to an embodiment. In an embodiment, apparatus 10 may be a node, host, or server in a communications network or serving such a network. For example, apparatus 10 may be a network node (e.g., an anchor network node, a last serving network node, an assisting network node, and/or a target network node), satellite, base station, a Node B, an evolved Node B (eNB), 5G Node B or access point, next generation (NG) Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 7a.

As illustrated in the example of FIG. 7a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 7a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations of flow or signaling diagrams illustrated in FIGS. 1-6. For instance, in one embodiment, apparatus 10 may be controlled by memory 14 and processor 12 to perform the method of FIG. 4, the method of FIG. 5, and/or the method of FIG. 6.

FIG. 7b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 7b.

As illustrated in the example of FIG. 7b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 7b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as Orthogonal Frequency-Division Multiple Access (OFDMA) symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIGS. 1-6. For instance, in one embodiment, apparatus 20 may be controlled by memory 24 and processor 22 to perform the method of FIG. 3.

In some embodiments, an apparatus may include means for performing a method or any of the variants discussed above, e.g., a method described with reference to FIG. 2, 3, 4, 5 or 6. Examples of the means may include one or more processors, memory, and/or computer program codes for causing the performance of the operation.

Therefore, certain example embodiments provide several technological improvements, enhancements, and/or advantages over existing technological processes. For example, one benefit of some example embodiments is reduction or elimination of unnecessary signalling associated with supporting the mobility of an inactive UE by reducing or eliminating unnecessary path switch procedures and/or decreasing context retrieval delay or retrieval failure likelihood. In the description above, the latter benefits were illustrated with respect to a radio area crossing, however, certain embodiments may be employed within a single configured radio area, for example, in a case where the configured radio area may not be constructed as having 1-hop direct connectivity between the network nodes. Accordingly, the use of some example embodiments results in improved functioning of communications networks and their nodes and, therefore constitute an improvement at least to the technological field of UE mobility, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural language is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described, it would be apparent to those of skill in the art that certain modifications, variations, and alternative constructions would be apparent, while remaining within the spirit and scope of example embodiments.

PARTIAL GLOSSARY

AMF Access and Mobility Management Function
AS Access Stratum
CN Core Network
CP Control plane
gNB Next Generation NB
NR New Radio
PDCCH Physical Downlink Control Channel
RAN Radio Access Network
RANAC RAN Area Code
RNA RAN Notification area
RNAU RAN Notification Area Update
RRC Radio Resource Control
SDT Small Data Transmission
UE User Equipment
UP User Plane
UPF User Plane Function
X2 X2 network interface
Xn Xn network interface
GSM Global System for Mobile Communications
NB-IoT Narrow band-Internet of things
WLAN Wireless Local Area Network
NFC Near-field communication
BT-LE Bluetooth Low Energy

The invention claimed is:
1. A first network node, comprising:
at least one processor; and
at least one memory including computer program code,
wherein the at least one memory and the computer program code are configured to, with the at least one processor, cause the first network node at least to:
configure a user equipment with a radio area associated with the user equipment;
assign, to the user equipment, a first identifier to be used by the user equipment within the configured radio area while in an inactive state for identifying the user equipment when accessing a network;
transmit, to a second network node, a message associated with duplicating a context associated with the user equipment at the second network node;
retain the context at the first network node;
maintain a core network user plane connectivity associated with the user equipment; and handle core network-triggered functionality for the user equipment.

2. The first network node according to claim 1, wherein the at least one memory and the computer program code are further configured to cause the first network node to:
transmit, to the user equipment, a second identifier provided by the second network node and to be used by the user equipment while in the inactive state for identifying the user equipment when accessing a network.

3. The first network node according to claim 2, wherein the second identifier is to be used by the user equipment within or outside the configured radio area.

4. The first network node according to claim 1, wherein the second identifier is used for at least one of context duplication within the configured radio area or context retrieval outside of the configured radio area.

5. A second network node, comprising:
at least one processor; and
at least one memory including computer program code,
wherein the at least one memory and the computer program code are configured to, with the at least one processor, cause the second network node at least to:
receive, from a first network node, a message associated with duplicating at the second network node a context associated with a user equipment,
store the duplicate of the context;
assign a second identifier to the user equipment, wherein the second identifier is different than a first identifier assigned to the user equipment by the first network node; and
wherein the first identifier and the second identifier are configured to be used by the user equipment while in an inactive state for identifying the user equipment when accessing a network.

6. The second network node according to claim 5, wherein the second identifier is used for at least one of context duplication within the configured radio area or context retrieval outside of the configured radio area.

7. The second network node according to claim 5, wherein the at least one memory and the computer program code are further configured to cause the second network node to:
transmit, to the user equipment, an indication of a type of the second identifier.

8. The second network node according to claim 5, wherein assigning the second identifier further comprises:
assigning the second identifier based on receiving a resume request message.

9. The second network node according to claim 5, wherein the at least one memory and the computer program code are further configured to cause the second network node to:
transmit, to the first network node, a context release indication after the context has been relocated to a target network node outside of the configured radio area.

10. The second network node according to claim 5, wherein the at least one memory and the computer program code are further configured to cause the second network node to:
transmit, to a third network node, a message associated with duplicating the context associated with the user equipment at the third network node or relocating the context associated with the user equipment to the third network node outside of the configured radio area.

11. A user equipment, comprising:
at least one processor; and
at least one memory including computer program code,
wherein the at least one memory and the computer program code are configured to, with the at least one processor, cause the user equipment at least to:
receive a radio area configuration and a first identifier from a first network node within the configured radio area;
receive a second identifier from a second network node within the configured radio area, wherein the first identifier and the second identifier are configured to be used by the user equipment while in an inactive state for identifying the user equipment when accessing a network; and
storing the radio area configuration, the first identifier, and the second identifier.

12. The user equipment according to claim 11, wherein the receiving of the second identifier is based on transmitting a resume request message to the second network node within the configured radio area.

13. The user equipment according to claim 11, wherein the at least one memory and the computer program code are further configured to cause the user equipment to:
transmit a resume request message towards the second network node or a target network node outside the configured radio area, wherein the resume request message comprises at least one of the first identifier or the second identifier.

14. The user equipment according to claim 11, wherein the at least one memory and the computer program code are further configured to cause the user equipment to:
receive a third identifier from a third network node within the configured radio area; and
over-write the second identifier with the third identifier.

15. The user equipment according to claim 11, wherein the at least one memory and the computer program code are further configured to cause the user equipment to:
receive an indication of a type of the second identifier.

* * * * *